United States Patent [19]

Nihoshi

[11] Patent Number: 4,527,869
[45] Date of Patent: Jul. 9, 1985

[54] MICROSCOPE PROVIDED WITH A PHOTOGRAPHING DEVICE

[75] Inventor: Toshiaki Nihoshi, Tokyo, Japan

[73] Assignee: Nippon Kogaku K.K., Tokyo, Japan

[21] Appl. No.: 499,549

[22] Filed: May 31, 1983

[30] Foreign Application Priority Data

Jun. 5, 1982 [JP] Japan ............................ 57-96845

[51] Int. Cl.³ .................. G02B 21/36; G02B 21/18
[52] U.S. Cl. ................................. 350/502; 350/511
[58] Field of Search ............... 350/502, 511, 508, 513, 350/514, 515, 507, 286, 287; 354/79; 250/201

[56] References Cited

U.S. PATENT DOCUMENTS 3,887,283  6/1975  Merstallinger et al. ............ 350/511
4,057,318  11/1977  Schindl ............................... 350/502

FOREIGN PATENT DOCUMENTS 31351    11/1964  German Democratic Rep. ............................ 350/502
1392446  4/1975  United Kingdom ............... 350/502

Primary Examiner—Jon W. Henry
Attorney, Agent, or Firm—Fitzpatrick, Cella, Harper & Scinto

[57] ABSTRACT

A microscope provided with a photographing device comprises an objective lens, prism means having a first surface opposed to the objective lens, a second surface parallel to the first surface, and a third and a fourth surface inclined by a predetermined angle with respect to the first and second surfaces and parallel to each other, the prism means introducing thereinto the emergent light from the objective lens through said first surface and causing the light to emerge from said second surface, light guide means for causing the emergent light from the second surface of the prism means to enter the third surface thereof, change-over means operated to change an optical path determined by the light guide means and direct the emergent light from said second surface to the photographing device, and an eyepiece system for receiving the emergent light from the fourth surface of the prism means.

9 Claims, 4 Drawing Figures

MICROSCOPE PROVIDED WITH A PHOTOGRAPHING DEVICE

BACKGROUND OF THE INVENTION

1. Field of the Invention

This invention relates to a microscope provided with a photographing device, and particularly to the optical system thereof.

2. Description of the Prior Art

When a photograph is to be taken by a microscope, it has heretofore chiefly been the practice to mount a photographing device as an accessory on the lens barrel of the microscope body or to change the entire lens barrel. Such practice has suffered from the disadvantage that the stability as a microscope is adversely effected or the reticle for focusing a sample cannot be binocularly observed. In contrast, microscopes for photography containing a photographing device therein are generally known, but in such microscopes, the imaging light beam is divided into various optical systems such as an observation system, a photographing system, a photometering system, etc. and therefore, the efficiency of brightness for photography is insufficient. Also, where partial photometering in which a narrow range is photometered is carried out, the confirmation of the photometering region only indicates the position corresponding to the actual photometering portion and this could not be said to be a reliable method. In order that a microscope may permit the photography by a TV camera, a cinecamera and a still camera and that even during various types of photography, the same image may be capable of being observed in the same field of view as that during ordinary observation and moreover the imaging light beam may be directed most efficiently, the apparatus has unavoidably become very much complicated and bulky.

SUMMARY OF THE INVENTION

It is an object of the present invention to provide a compact microscope provided with a photographing device by a simple construction.

It is another object of the present invention to provide a microscope which, during photography, enables the same image to be observed in the same field of view as that during ordinary observation and moreover enables the imaging light beam to be directed most efficiently to the photographing device.

It is still another object of the present invention to provide a microscope which enables a photographic image to be focused in the condition of binocular observation and enables the photometering position of a minute region for photography to be properly confirmed.

A microscope provided with a photographing device in accordance with the present invention includes an objective lens, prism means having a first surface opposed to the objective lens, a second surface parallel to the first surface, and a third and a fourth surface inclined by a predetermined angle with respect to the first and second surfaces and parallel to each other, the prism means introducing thereinto the emergent light from the objective lens through said first surface and causing the light to emerge from said second surface, light guide means for causing the emergent light from the second surface of the prism means to enter the third surface thereof, change-over means operated to change an optical path determined by the light guide means and direct the emergent light from said second surface to the photographing device, and an eyepiece system for receiving the emergent light from the fourth surface of the prism means.

The invention will become more fully apparent from the following detailed description thereof taken in conjunction with the accompanying drawings.

DESCRIPTION OF THE PREFERRED EMBODIMENT

Figure 1:
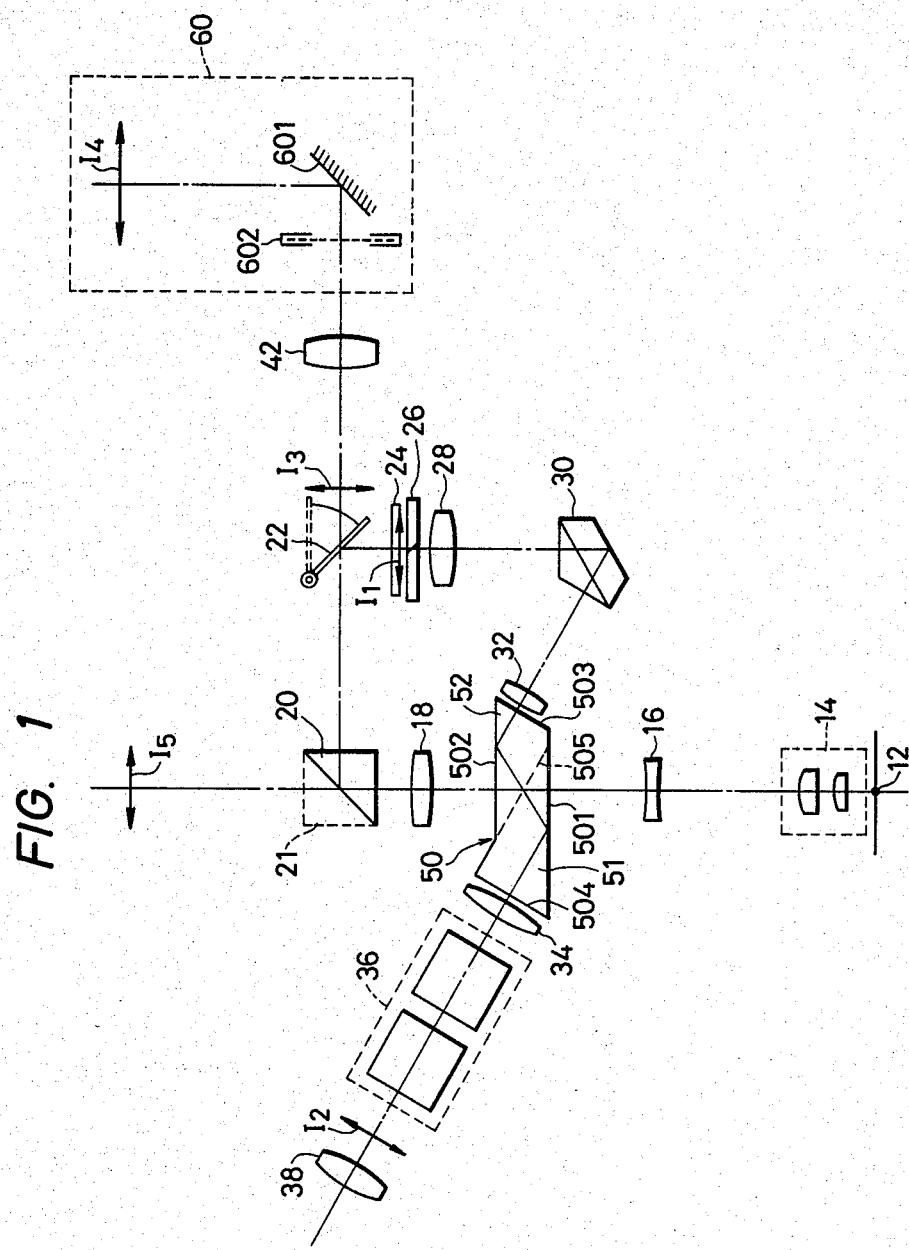
FIG. 1 schematically shows the optical path of an apparatus according to an embodiment of the present invention.

FIG. 1 is a schematic view of the optical path of a photographic microscope device according to the present invention and shows the condition thereof in the case of photographing. The light beam from an object 12 emergent from an objective lens 14 passes through a negative lens 16, and then becomes a substantially parallel light beam and reaches a quadrilateral prism 50. This prism 50 has a first surface 501 and a second surface 502 parallel to each other and a third surface 503 and a fourth surface 504 inclined by about 60° with respect to the first and second surfaces and parallel to each other, and more specifically, it comprises two triangular prisms 51 and 52 cemented together at an inclined surface 505 inclined by about 30° with respect to the first surface 501.

The light beam from the objective lens 14 is transmitted through the first surface 501 and the second surface 502 of the prism 50, passes through a positive lens 18, is reflected at 90° by a reflecting prism 20, is downwardly reflected while being changed in direction at 90° by a pivotable mirror 22, is converged on a glass plate 24 and forms an object image $I_1$ thereon. The light beam from the object image $I_1$ passes through a photometric prism 26 and a positive lens 28 which will be described later, and is reflected upwardly at about 30° by a reflecting prism 30 having a roof surface, whereafter it passes through a positive lens 32 and enters the third surface 503 of the prism 50.

The light beam which has entered the prism 50 through the third surface 503 thereof is totally reflected by the second surface 502 and the first surface 501 and emerges from the fourth surface 504. It further passes through a positive lens 34 and a binocular barrel prism 36 and re-imaged images $I_2$ of the object image I are formed at the forward focus position of an eyepiece 38. The light beam is divided into two light beams by the binocular barrel prism 36 and two object images $I_2$ are formed in juxtaposed relationship and may be binocularly observed through the eyepiece, but these constructions are well-known and therefore only one of the two object images is shown in FIG. 1.

Figure 2:
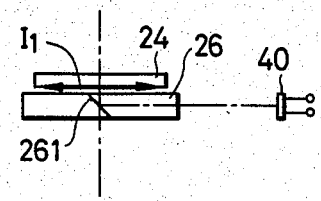
FIG. 2 is an enlarged cross-sectional view of the vicinity of a photometering portion.

The confirmation of the field of view for photographing and the photometering for exposure determination are effected in the following manner. FIG. 2 is an enlarged view of the glass plate 24 on which the object image $I_1$ is formed and a photometering portion including the photometric prism 26. A reticle on which a frame for prescribing the photographing range is depicted is provided on the emergent light side of the glass plate 24 and the object image $I_1$ is formed thereon. The photometric prism 26 provided adjacent to the glass plate 24 has a semitransmitting surface 261 obliquely disposed therein, and the light beam reflected by the semitransmitting surface 261 enters a light-receiving element 40 provided laterally of the photometric prism 26 and the intensity of light thereof is measured. The semitransmitting surface 261 is formed by depositing by evaporation a semitransparent film in an elliptical shape on the inclined surface, and is of a circular shape when viewed from the direction of the optical axis.

Figure 3:
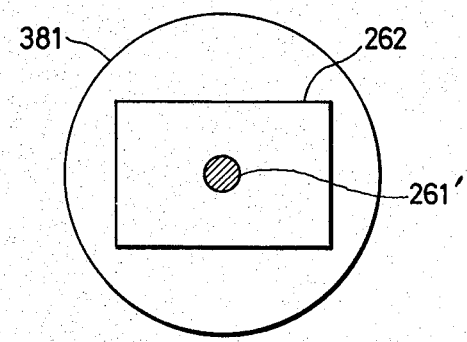
FIG. 3 shows the field of view of the eyepiece of FIG. 1.

Therefore, as shown in FIG. 3, the image 262 of a square frame and the image 261' of the semitransmitting surface 261 in the photometric prism are formed in a circular field of view 381 observed through the eyepiece 38. The image 261' is somewhat darker than its circumambience by an amount corresponding to the quantity of light reflected for photometering by the semitransmitting surface 261.

Since the semitransmitting surface 261 is closely adjacent to the object image $I_1$, the area of the object image which overlaps the image 261' is the photometering area itself and thus, the photometering area in the object can be recognized very accurately. For the photometering of a minute portion, the photometric prism 26 may be replaced by one in which the shape of the semitransmitting surface 261 is smaller, and to change the photometering region, it is desirable that the photometric prism 26 be provided for movement in a direction perpendicular to the optical axis.

The field of view is confirmed in this manner and the photometering of a desired region is effected, whereafter the pivotable mirror 22 is retracted, whereby photographing is effected. That is, the pivotable mirror 22 is a so-called quick return mirror adapted to be retracted as indicated by dotted line in FIG. 1 in synchronism with the photographing operation by the photographing device 60, and during photography, an object image $I_3$ is formed rearwardly thereof and an object image $I_4$ is re-imaged by a relay lens 42 after the reflection by a mirror 601. A film, not shown, is disposed at the position of this object image $I_4$, and appropriate exposure is effected by a shutter 602, whereby photographing is accomplished.

During photography, all the light beam from the objective lens passed through the reflecting prism 20 is directed to the photographing device, whereby photographing can be accomplished efficiently in the brightest condition. By the reflecting prism 20 being replaced by a semitransmitting prism mirror 21, an object image $I_5$ is formed rearwardly thereof and this object image $I_5$ can be photographed by a TV camera or a cinecamera. Accordingly, it is possible to take out the picture-taking light beam from the positions of both the prism 21 and the pivotable mirror 22 and effect two types of photography at a time while binocularly observing the object through the eyepiece 38.

Figure 4:
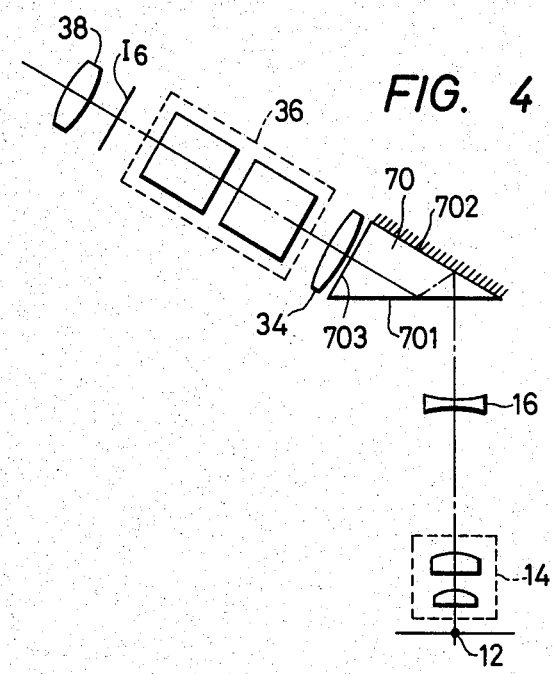
FIG. 4 schematically shows the optical path when the quadrilateral prism of FIG. 1 is replaced by a triangular prism.

As described above, during the observation involving photography, the prism 50 is inserted into the optical path and the light beam transmitted therethrough is again transmitted through the prism 50 and is directed to the eyepiece with the optical paths intersecting each other in the prism 50, whereas when only ordinary observation is effected without photography being effected, a triangular prism 70 instead of the prism 50 is inserted into the optical path, as shown in FIG. 4. In this case, the light beam from the object 12 emergent from the objective lens 14 passes through the negative lens 16, whereafter it is transmitted through a first surface 701 of the prism 70 and is reflected by a second surface 702 of the prism 70 which is inclined at about 30° and formed into a reflecting surface, and is totally reflected by the first surface 701 and thereafter emerges from a third surface 703 of the prism 70. An object image $I_6$ is formed on the forward focus of the eyepiece 38. The first surface 701 of the prism 70 corresponds to the first surface of the prism 50, the second surface 702 of the prism 70 corresponds to the cemented surface 505, and the third surface 703 of the prism 70 corresponds to the fourth surface 504. Thus, the prism 70 is of the same shape as the triangular prism 51 of the prism 50. The second surface 702 of the prism 70 is a reflecting surface on which silver or aluminum is deposited by evaporation and therefore, no light beam enters the positive lens 18 and the object image formed is $I_6$ alone.

Both of the object images $I_2$ and $I_6$ formed on the forward focus of the eyepiece 38 of FIGS. 1 and 4 are inverted real images.

Accordingly, if each relay lens is constructed such that the size of the object image $I_6$ when the prism 70 is disposed is equal to the size of the object image $I_2$ when the prism 50 is disposed, the object images in the same state can be binocularly observed through the eyepiece 38 irrespective of the interchange of the prisms 50 and 70. However, when the prism 50 is disposed, a re-imaged image is observed, whereas when the prism 70 is disposed, the object image can be directly observed and therefore, when it is not necessary to effect photography, the most excellent image can be observed by the prism 70 being disposed.

In the above-described embodiment, the photometric prism 26 is provided on the emergent light side of the glass plate 24 for effecting focusing during photography, but alternatively, it may be provided on the incident light side of the glass plate and essentially, it is desirable that the object image formed on the glass plate and the obliquely disposed semitransmitting portion in the photometric prism 26 for extracting the photometering light beam be proximate to each other. If this if done, the photometering region can be displayed more accurately. Although a roof surface is provided on the reflecting prism 30, a roof surface may be provided on the prism 20 or the mirror 22.

I claim:

1. A microscope provided with a photographing device comprising:
   (a) an objective lens system:
   (b) prism means provided with a first surface opposed to said objective lens system, a second surface parallel to said first surface, a third surface having a predetermined angle with respect to said second surface and a fourth surface parallel to said third surface, said prism means introducing thereinto the emergent light from said objective lens system through said first surface and causing said light to emerge from said second surface;
   (c) light guide means for causing the emergent light from said second surface of said prism means to enter said third surface, said light guide means including a plurality of reflecting members for determining the optical path of the emergent light from said second surface so that the light having entered said prism means through said third surface thereof emerges from said fourth surface one of said plurality of reflecting members of said light guide means including a roof surface having a pair of reflecting surfaces intersecting each other;

(d) change-over means operated to change the optical path determined by said light guide means and direct the emergent light from said second surface to said photographing device; and (e) an eyepiece system for receiving the emergent light from said fourth surface of said prism means.

2. A microscope according to claim 1, wherein said change-over means includes means for retracting one of said plurality of reflecting members of said light guide means out of said optical path.

3. A microscope according to claim 1, wherein said prism means reflects the incident light from said third surface on said first and second surfaces and thereafter causes said light to emerge from said fourth surface.

4. A microscope according to claim 1, wherein said light guide means includes optical means cooperating with said objective lens system to form an object image between said plurality of reflecting members, and said change-over means is disposed between said plurality of reflecting members.

5. A microscope according to claim 1, wherein said light guide means includes first optical means cooperating with said objective lens system to form an object image between said plurality of reflecting members and second optical means for causing said object image to be re-imaged forwardly of said eyepiece system.

6. A microscope according to claim 1, wherein said light guide means includes frame means provided on a predetermined surface between said change-over means and said third surface of said prism means to indicate an area photographed by said photographing device, first optical means cooperating with said objective lens system to form an object image on said predetermined surface, and second optical means provided between said predetermined surface and said eyepiece system, said second optical means being disposed so that said predetermined surface is conjugate with respect to said second optical means forwardly of said eyepiece system.

7. A microscope according to claim 1, wherein said light guide means includes means cooperating with said objective lens system to form an object image forwardly of said eyepiece system and said microscope further comprises means for forming the image of a frame indicating an area photographed by said photographing device in overlapping relationship with the object image forward of said eyepiece system.

8. A microscope according to claim 1, further comprising photometering means having light-receiving means and means disposed in the optical path between said change-over means and said third surface of said prism means to direct part of the emergent light from said second surface of said prism means to said light-receiving means.

9. A microscope according to claim 3, wherein said predetermined angle formed by and between said second surface and said third surface of said prism means is approximately 60°.

* * * * *

UNITED STATES PATENT AND TRADEMARK OFFICE
CERTIFICATE OF CORRECTION

PATENT NO. : 4,527,869
DATED : July 9, 1985
INVENTOR(S) : TOSHIAKI NIHOSHI

It is certified that error appears in the above-identified patent and that said Letters Patent is hereby corrected as shown below:

Column 2, line 56, "I" should be $--I_1--$.

Signed and Sealed this

Seventeenth Day of December 1985

[SEAL]

Attest:

DONALD J. QUIGG

Attesting Officer     Commissioner of Patents and Trademarks